(12) United States Patent
Ranjan

(10) Patent No.: US 9,723,312 B2
(45) Date of Patent: Aug. 1, 2017

(54) METHOD AND SYSTEM FOR RANDOM ACCESSIBLE IMAGE COMPRESSION WITH ADAPTIVE QUANTIZATION

(71) Applicant: SAMSUNG ELECTRONICS CO., LTD., Suwon-si (KR)

(72) Inventor: Pratyush Kumar Ranjan, Karnataka (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 14/734,307

(22) Filed: Jun. 9, 2015

(65) Prior Publication Data
US 2016/0366409 A1 Dec. 15, 2016

(51) Int. Cl.
| G06K 9/36 | (2006.01) |
| G06K 9/46 | (2006.01) |
| H04N 19/124 | (2014.01) |
| H04N 19/176 | (2014.01) |
| H04N 19/15 | (2014.01) |
| H04N 19/625 | (2014.01) |

(52) U.S. Cl.
CPC ........... *H04N 19/124* (2014.11); *H04N 19/15* (2014.11); *H04N 19/176* (2014.11); *H04N 19/625* (2014.11)

(58) Field of Classification Search
CPC ............... H04N 19/124; H04N 19/176; H04N 19/1887; H04N 19/625; H04N 19/60; G06T 9/005
See application file for complete search history.

(56) References Cited

U.S. PATENT DOCUMENTS

| 5,293,252 A * | 3/1994 | Kim ..................... H04N 11/044 375/E7.134 |
| 5,481,309 A * | 1/1996 | Juri ...................... H04N 5/9264 375/240.03 |
| 5,677,689 A * | 10/1997 | Yovanof .............. H04N 19/176 341/50 |
| 6,084,913 A | 7/2000 | Kajiki et al. |
| 6,118,903 A | 9/2000 | Liu |
| 6,504,494 B1 * | 1/2003 | Dyas ................... H04N 19/176 341/50 |
| 7,313,283 B2 | 12/2007 | Kondo et al. |
| 7,430,330 B2 | 9/2008 | Hamilton |
| 7,499,592 B2 | 3/2009 | Nakayama et al. |
| 7,570,827 B2 | 8/2009 | Yang et al. |
| 7,643,695 B2 | 1/2010 | Nakayama |
| 2002/0131645 A1 * | 9/2002 | Hamilton ................. G06T 9/00 382/251 |
| 2005/0254576 A1 | 11/2005 | Huang |

(Continued)

*Primary Examiner* — Phuoc Tran
(74) *Attorney, Agent, or Firm* — Sughrue Mion, PLLC

(57) ABSTRACT

A method and system of image compression with random access capability are provided. The method includes segmenting an image into blocks, each block including predefined samples; transforming the predefined samples into a frequency domain; applying a first quantization factor to the transformed predefined samples; determining whether application of the first quantization factor results in a bit count that is within a tolerance range of an allowable bit count; and adaptively computing a second quantization factor in response to determining that the bit count is not within the tolerance range of the allowable bit count.

22 Claims, 6 Drawing Sheets

(56) References Cited

U.S. PATENT DOCUMENTS

2008/0260272 A1 10/2008 Wada
2011/0123128 A1* 5/2011 Huang .................. H04N 19/15
 382/251
2014/0105514 A1 4/2014 Wu et al.

* cited by examiner

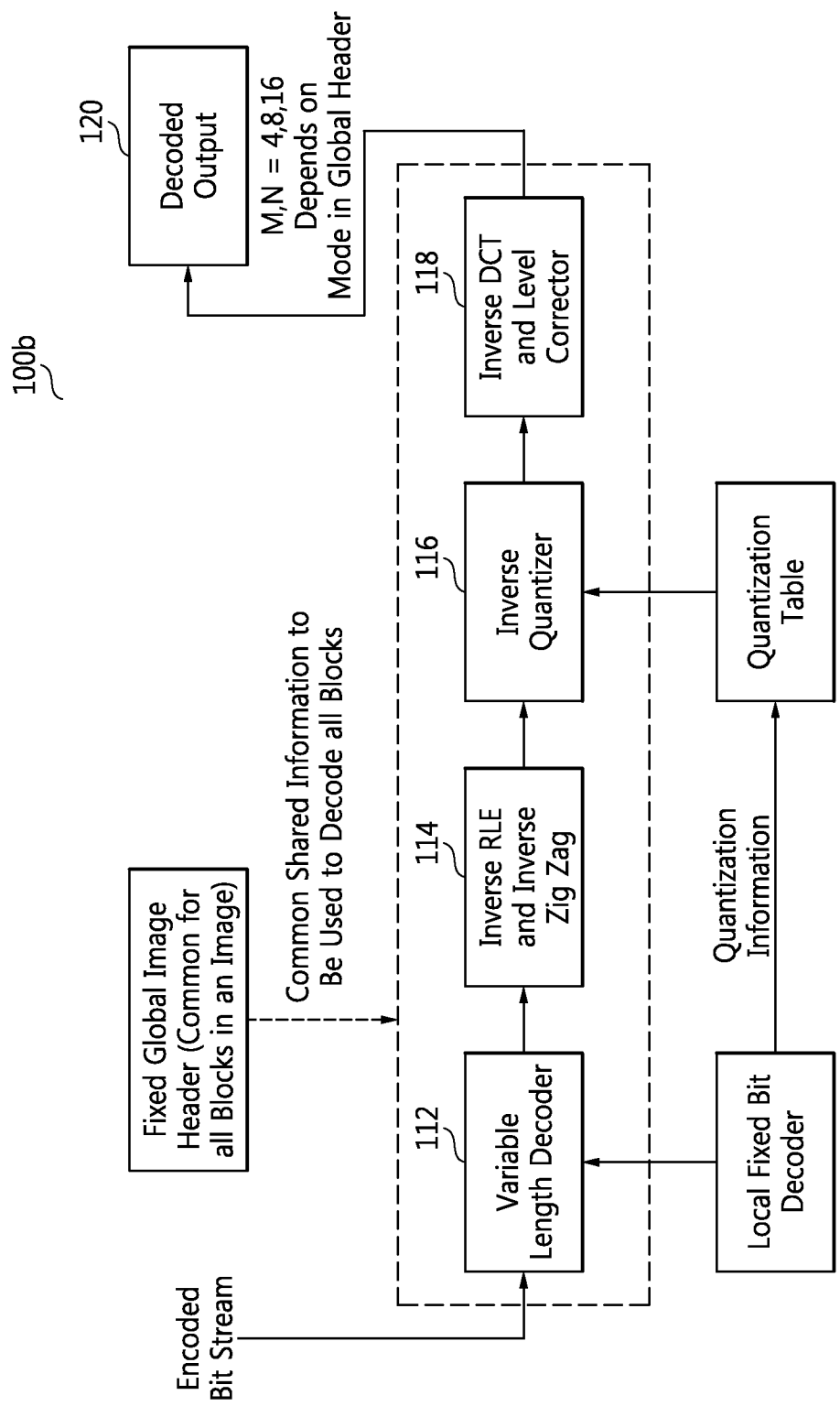

FIG. 2A

| 6000 | 503 | 267 | 198 |
|------|-----|-----|-----|
| 564  | 458 | 65  | 40  |
| 450  | 45  | 38  | 15  |
| 210  | 23  | 12  | 8   |

FIG. 2B $Q_{default} =$

| 100 | 100 | 100 | 100 |
|-----|-----|-----|-----|
| 100 | 100 | 100 | 100 |
| 100 | 100 | 100 | 100 |
| 100 | 100 | 100 | 100 |

FIG. 2C

| 60 | 5 | 2 | 1 |
|----|---|---|---|
| 5  | 4 | 0 | 0 |
| 4  | 0 | 0 | 0 |
| 2  | 0 | 0 | 0 |

FIG. 2D

| 60 | 5 | 2 | 1 |
|----|---|---|---|
| 5  | 4 | 0 | 0 |
| 4  | 0 | 0 | 0 |
| 2  | 0 | 0 | 0 |

FIG. 3A

| 6000 | 503 | 267 | 198 |
|------|-----|-----|-----|
| 564  | 458 | 65  | 40  |
| 450  | 45  | 38  | 15  |
| 210  | 23  | 12  | 8   |

FIG. 3B $Q_{default} =$

| 100 | 150 | 150 | 200 |
|-----|-----|-----|-----|
| 150 | 170 | 170 | 220 |
| 160 | 170 | 180 | 240 |
| 200 | 180 | 200 | 250 |

FIG. 3C

| 60 | 3 | 1 | 0 |
|----|---|---|---|
| 3  | 2 | 0 | 0 |
| 2  | 0 | 0 | 0 |
| 1  | 0 | 0 | 0 |

FIG. 3D

| 60 | 3 | 0 | 0 |
|----|---|---|---|
| 3  | 2 | 0 | 0 |
| 2  | 0 | 0 | 0 |
| 1  | 0 | 0 | 0 |

METHOD AND SYSTEM FOR RANDOM ACCESSIBLE IMAGE COMPRESSION WITH ADAPTIVE QUANTIZATION

FIELD

Apparatuses, methods, devices, and articles of manufacture consistent with the present disclosure relate to image compression and more particularly to random accessible image compression with adaptive quantization.

BACKGROUND

Generally, one commonly-used technique for compressing digital images is a JPEG technique, named for the Joint Photographic Experts Group (JPEG), the committee that developed the specifications for standard use of the technique and for the standard storage format of JPEG image files. The JPEG technique is "lossy". That is, an image that has been compressed by the JPEG technique and then reconstituted is not identical to the original, uncompressed image.

In related art image compression methods, a Differential pulse-code modulation (DPCM) or a Pulse-code modulation (PCM) is used to encode an entire image approximately within a pre-defined number of bits in a constant bitrate scenario or to encode an entire image approximately at pre-defined quality in a constant quality scenario. In this method, top, left, and top left pixels are subtracted from a current pixel to get a residual value which is quantized, and the quantization factor determines the mode of encoding. The code length computation is performed for all the quantized values. The quantization is not adaptive i.e., the quantization is uniform for each block of the image.

In other related art image compression methods, the image samples are transformed and quantized by using Discrete Cosine Transform (DCT), run-length encoding (RLE), and Huffman encoding. Here, the method uses a separate control structure for random accessibility. The encoded size of the blocks can be different and no fixed bit budget per block is maintained.

Related art image compression methods are unable to exploit visual masking and other properties of the Human Visual System (HVS) which vary spatially with image content. This is because the quantization parameters used by these algorithms are typically constant over the extent of the image. As a result, images are unable to be compressed efficiently. Also, to achieve a target bit-rate or visual quality using these systems, the image must be compressed multiple times.

SUMMARY

According to an aspect of an exemplary embodiment, there is provided a method that includes segmenting an image into a plurality of blocks, each block including predefined samples; transforming the predefined samples into a frequency domain; applying a first quantization factor to the transformed predefined samples; determining whether application of the first quantization factor results in a bit count that is within a tolerance range of an allowable bit count; and adaptively computing a second quantization factor in response to determining that the bit count is not within the tolerance range of the allowable bit count.

According to another aspect of an exemplary embodiment, there is provided an encoder for image compression with random access capability, the encoder being configured to segment an image into a plurality of blocks, each block including predefined samples; transform the predefined samples into a frequency domain; apply a first quantization factor to the transformed predefined samples; determine whether the first quantization factor results in a bit count that is within a tolerance range of an allowable bit count; and adaptively compute a second quantization factor in response to determining that the bit count is not within the tolerance range of the allowable bit count.

According to yet another aspect of an exemplary embodiment, there is provided a computer program product comprising computer executable program code recorded on a computer readable non-transitory storage medium, said computer executable program code when executed causing a computer to segment an image into a plurality of blocks, each block including predefined samples; transform the predefined samples into a frequency domain; apply a first quantization factor to the transformed predefined samples; determine whether the first quantization factor results in a bit count that is within a tolerance range of an allowable bit count; and adaptively compute a second quantization factor in response to determining that the bit count is not within the tolerance range of the allowable bit count.

BRIEF DESCRIPTION OF THE DRAWINGS

Exemplary embodiments will be better understood from the following description with reference to the drawings, in which:

FIG. 1B illustrates a block diagram of a decoder, according to an exemplary embodiment;

FIGS. 2A-2D illustrate an example scenario for compressing without rounding a 4×4 pixel dimension block of an image, according to an exemplary embodiment;

FIGS. 3A-3D illustrate another example scenario for compressing without rounding a 4×4 pixel dimension block of an image, according to an exemplary embodiment;

DETAILED DESCRIPTION

Figure 1A:
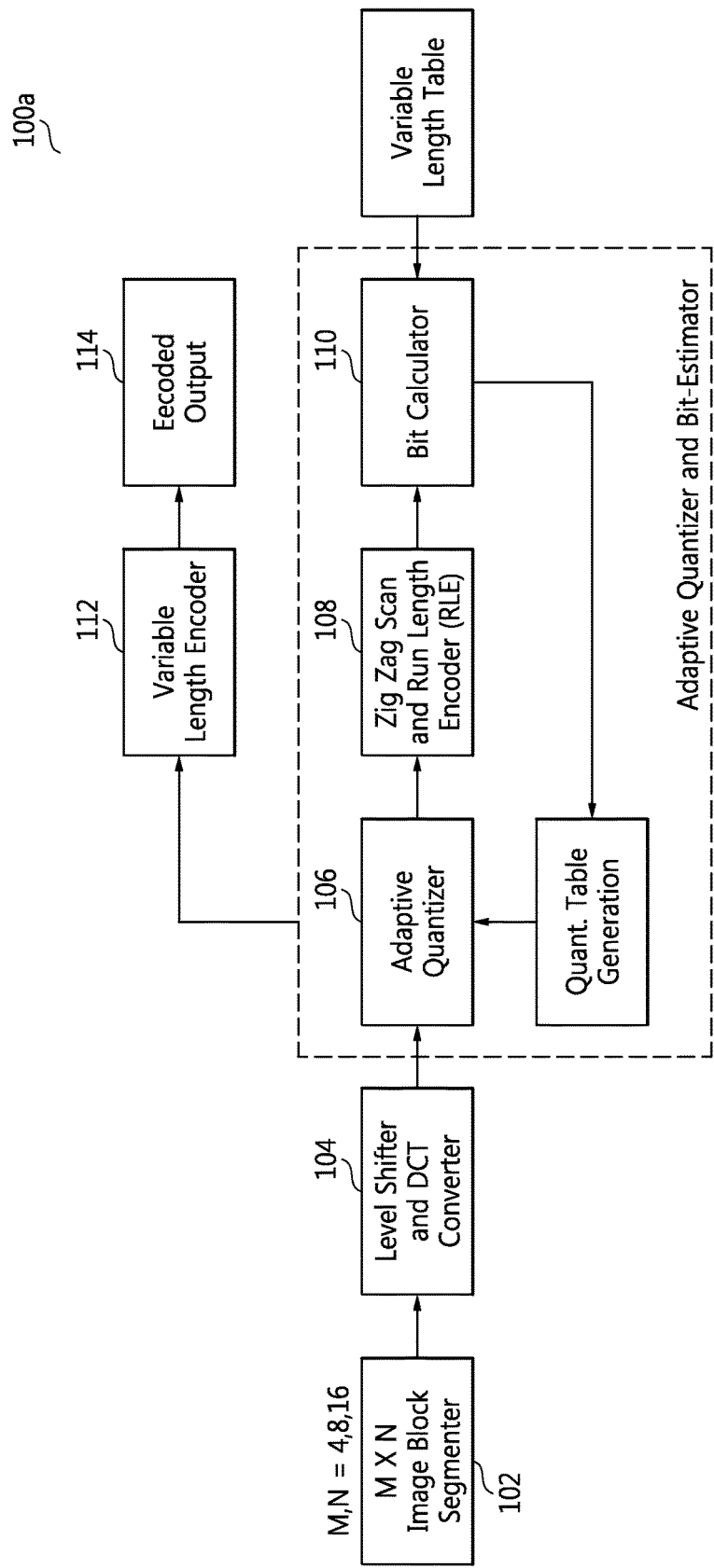
FIG. 1A illustrates an example of a system of image compression and decompression with random access capability using Discrete Cosine Transform (DCT), according to an exemplary embodiment.

The above and other aspects will be better appreciated and understood when considered in conjunction with the following description and the accompanying drawings. It should be understood, however, that the following descriptions are given by way of illustration and not of limitation. Many changes and modifications can be made within the scope of the exemplary embodiments herein without departing from the spirit thereof, and the exemplary embodiments herein include all such modifications.

The exemplary embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the exemplary embodiments herein.

Also, the various exemplary embodiments described herein are not necessarily mutually exclusive, as some exemplary embodiments can be combined with one or more other exemplary embodiments to form new embodiments. The term "or" as used herein, refers to a non-exclusive or, unless otherwise indicated. The examples used herein are intended merely to facilitate an understanding of ways in which the exemplary embodiments herein can be practiced and to further enable those skilled in the art to practice the exemplary embodiments herein. Accordingly, the examples should not be construed as limiting the scope of the exemplary embodiments herein.

The exemplary embodiments herein disclose a method and system for image compression with random access capability using DCT. The method includes segmenting an image into a plurality of blocks, where each block includes predefined samples. Further, the method includes transforming the predefined samples into a frequency domain. In an exemplary embodiment, the predefined samples are transformed into the frequency domain using the DCT. Further, the method includes applying a first quantization factor to the transformed predefined samples. Further, the method includes determining whether the application of the first quantization factor results in a bit count within an allowable bit count. Furthermore, the method includes adaptively computing a second quantization factor in response to determining that the first quantization factor results in the bit count unequal to the allowable bit count.

In an exemplary embodiment, adaptively computing the second quantization factor includes calculating a difference between the bit count and the allowable bit count. The second quantization factor is computed based on the first quantization factor and the calculated difference. In an exemplary embodiment, the second quantization factor is computed when the first quantization factor results in the bit count being less than the allowable bit count. In another exemplary embodiment, the second quantization factor is computed when the first quantization factor results in the bit count being greater than the allowable bit count.

In an exemplary embodiment, the method also includes encoding the transformed predefined samples after determining that the first quantization factor results in a bit count within a tolerance range of the allowable bit count. That is, the allowable bit count includes a fixed bit count (for example 128 bits) plus or minus a certain tolerance of bits (for example +/−6 bits in the case of +/−5% tolerance) to the fixed bit count. Hence an example of the allowable bit count range may be 122 bits to 134 bits. However, this is only an example, the the fixed bit count may be different than 128 bits, and the tolerance may be different than +/−5%. In an exemplary embodiment, the encoding can be, for example but not limited to, variable length encoding. For example, the variable length encoding may be Huffman encoding.

The method and system described herein is simple and robust for random accessible compression of a sequence consisting of an image or a texture image using the DCT, an adaptive quantization, and a variable length encoding.

For example, consider an example scenario where an allowable bit count is 128 bits. Initially, the image is segmented into a plurality of blocks. Each segmented block of the image can have a pixel dimension of M×N, where "M" represents the number of pixels in a row and "N" represents the number of pixels in a column. The DCT is performed to convert the pixels from a spatial domain to coefficients in a frequency domain. For example, consider a 2×2 pixel dimension block as shown below by Table-1 (i.e., in the form of a matrix) in which the pixel values are transformed from the spatial domain to the frequency domain using the DCT. Here, the 2×2 pixel dimension block may have 4 pixel values which will be in a YCrCb color space.

TABLE 1

| 100 | 75 |
|---|---|
| 50 | 25 |

Now, a default quantization factor (i.e., in the form of a matrix) is generated as shown below by Table-2. In this example, the default quantization factor is 10.

TABLE 2

| 10 | 10 |
|---|---|
| 10 | 10 |

Then each frequency coefficient value in the 2×2 pixel block is divided by the default quantization factor (i.e., 10) thereby, obtaining a quantized matrix as shown below by Table-3.

TABLE 3

| 10 | 7.5 |
|---|---|
| 5 | 2.5 |

On obtaining the quantized matrix, a number of bits for encoding the values in the quantized matrix is determined. If the number of bits is determined to be 130, then the quantization factor can be increased from the value of 10 to a value of 11 and the same process is repeated. On the other hand, if the number of bits is determined to be 125 on using the quantization factor of 11, then the transformed 2×2 pixel dimension block is encoded because the new bit count is within the allowable bit count (e.g., 128 in this example) and the encoded block of the image is obtained.

In related art systems, the image compressors such as JPEG are not random accessible and there are no guidelines for the quantization factor. The manufacturer is free to use any quantization factor and the quantization factor is encoded in the bit-stream in the JPEG. For an entire image, one quantization factor is used i.e., each block of the image will use same quantization factor.

Unlike the related art systems, the proposed method and system uses the DCT and a unique combination of the adaptive quantizer, and a variable length encoder to encode image samples into a fixed number of bits. The quantization factor generated by the adaptive quantizer changes dynamically based on the content of the block which is encoded so that the block fits into the bit budget, thereby attaining higher quality at a given compression ratio when compared with traditional texture compressors. The related art block truncation coding based texture compressors work on the spatial domain only and not in the frequency domain. The control over the bit rate and the quality of each block can be achieved, i.e., a fixed block size can have three bit budgets. Therefore, it is easier to encode and the encoder and decoder use computationally simple methods.

Referring now to the drawings, and more particularly to FIGS. 1 through 5, where similar reference characters denote corresponding features consistently throughout the drawings, there are shown certain exemplary embodiments.

FIG. 1A illustrates an example of a system of image compression with Random Access Capability using Discrete Cosine Transform (DCT), according to an exemplary embodiemnt. A system 100a includes a M×N image block segmenter 102, a level shifter and DCT converter 104, an adaptive quantizer 106, a Zig Zag scan and run length encoder (RLE), a bit calculator 110, and a variable length encoder 112. The respective blocks of the system 100a perform a sequence of operations during an encoding process including constructing a M×N texture block of an image 102, performing a level shift and a DCT 104, performing an adaptive quantization 106, performing Zig Zag scanning and Run length encoding (RLE) 108, performing bit calculation 110, performing variable length encoding 112, and obtaining an encoded output 114. However, the sequence of operations need not be performed in the exact order given; some variation in performing the operations may be possible. Here, the sequence of operations can be performed by using an encoder, a microcontroller, a microprocessor, or a computer reading a computer readable storage medium.

Initially, the image is segmented into a plurality of macro blocks, where each macro block of the image includes predefined samples. Each segmented block of the image can have a pixel dimension of M×N, where "M" represents the number of pixels in a row and "N" represents the number of pixels in a column. In the M×N image block segmenter 102, an image is segmented into an M×N pixel dimension block including predefined samples. Alternatively the M×N pixel dimension block may be received as the input for initiating the encoding process as shown in the FIG. 1A.

In the level shifter and DCT converter 104, in an exemplary embodiment, on receiving the M×N pixel dimension block including predefined samples, a level shift is performed on the M×N pixel dimension block where a constant value (for example, a constant value of 128) is subtracted from each pixel value in the M×N pixel dimension block. The level shift is performed on the M×N pixel dimension block to reduce the magnitude of the Direct Current (DC) component in the pixel values. After carrying out the level shift process, the DCT is performed to convert the pixels from a spatial domain to coefficients in a frequency domain because the coefficients in the frequency domain may have much higher bit width than the pixels in the spatial domain as the information is better compacted in the frequency domain than in the spatial domain. In the frequency domain, most of the information is concentrated in DC and low frequency components making the transformation ideal for lossy components.

By performing the level shift process, many high frequency components present in the M×N pixel dimension block can be removed without loss of visual quality. In another exemplary embodiment, on receiving the M×N pixel dimension block, the DCT is performed to convert the pixels from the spatial domain into coefficients in the frequency domain without performing the level shift process. In an exemplary embodiment, on performing the DCT to transform the pixel values in the M×N pixel dimension block, the content of the picture, i.e., low frequency components available at top left part of the image of the DCT matrix, may be of a high magnitude when compared to the high frequency components available at the bottom left part of the image of the DCT matrix.

In the adaptive quantizer 106, on receiving the transformed M×N pixel dimension block, the transformed frequency coefficients of the M×N pixel dimension block are quantized, thereby obtaining a quantized M×N pixel dimension block. Here, a default adaptive quantization factor can be generated, or a default adaptive quantization factor may be predefined to form a quantization matrix by using the quantization table. Here, the quantization is generated in such a way that the high frequency components are decimated more than the low frequency components in the M×N pixel dimension block. Each frequency coefficient value in the M×N pixel dimension block is divided by the default adaptive quantization factor to obtain a quantized M×N pixel dimension block. The adaptive quantization is performed on the M×N pixel dimension block to normalize the transformed frequency coefficients due to their high value.

In the Zig Zag scan and Run length encoder (RLE) 108, the obtained quantized M×N pixel dimension block may be scanned in a "Zig Zag" order to obtain a series of numbers. If it is determined to detect zeros before a non-zero coefficient then, it is represented as the count of zeros (i.e., Zig Zag scanning and Run length encoding (RLE)). In the bit calculator 110, on completing the Zig Zag scanning process, the number of bits for encoding the scanned coefficients can be determined from the variable length table as shown in the FIG. 1A. In an exemplary embodiment, the variable length table can be, for example, but is not limited to, a Huffman encoding table. The variable length table includes run order (i.e., zeros) and length (i.e. magnitude) of each coefficient to encode. From the above information, the number of bits for encoding each scanned coefficient is obtained. The encode bit estimate of each coefficient is added to obtain a sum of bits which denotes the number of bits for encoding the scanned coefficients. If the sum is greater than the bit budget, then a higher quantization factor may be generated and the encoding process may be repeated. If the sum is smaller than the bit budget, then a smaller quantization value may be generated. For example, consider an example scenario where the allowable bit count is 160 bits and the encoding for the first quantization factor results in a bit count of 170. It is observed that the bit count is exceeding the allowable bit count, and thus the first quantization factor is reduced so that the quality of the image can be increased as the quality of the image is inversely proportional to the quantization value.

In the variable length encoder 112, on determining the quantization factor results in the bit count being equal to the allowable bit count then the transformed pixel values in the M×N pixel dimension block are encoded. At 114 the encoded output is obtained thereby, completing the encoding process. In an exemplary embodiment, the encoding may be variable length encoding. In an exemplary embodiment, the variable length encoding can be, for example, but is not limited to, a Huffman encoding, arithmetic encoding, or any other encoding method.

FIG. 1B illustrates a block diagram of a decoder, according to an exemplary embodiment. In an exemplary embodiment, a decoder 100b includes a variable length decoder 112, an inverse RLE and inverse Zig Zag 114, an inverse quantizer 116, and an inverse DCT and level corrector 118. The respective blocks of the decoder 100b perform a sequence of operations performed during a decoding process including a variable length decode 112, an inverse run length encoding (RLE) and inverse zigzag 114, an inverse quantization 116, an inverse DCT 118, and obtaining an decoded output 120. However, the sequence of operations need not be performed in the exact order given; some variation in performing the operations may be possible. Here, the sequence of operations can be performed by using a decoder, a microcontroller, a microprocessor, or a computer reading a computer readable storage medium.

Initially, the encoded bit stream data can be received as the input for initiating the decoding process as shown in the FIG. 1B. In the variable length decoder 112, in an exemplary embodiment, on receiving the encoded bit stream data, the encoded bit stream data is variable length decoded.

In the inverse RLE and inverse Zig Zag 114, on receiving the decoded bit stream data, inverse RLE and the inverse Zig Zag scanning is performed on the decoded bit stream data by executing a series of reordering operations on the bit stream data to reorder the data by receiving the sequence of quantized coefficient groups. In the inverse quantizer 116, the inverse quantizer receives the sequence of quantized coefficient matrices after completing the inverse RLE and the inverse Zig Zag scanning process and individually scales elements of the quantized coefficient matrices to form a sequence of DCT coefficient matrices where each element of the DCT matrices is represented using sign and magnitude.

In the inverse DCT and level corrector 118, on receiving the DCT matrix after completing the inverse quantization, an inverse DCT is performed to convert the DCT matrix into an image correction block. At block 120, the decoded output is obtained, thereby completing the decoding process. Also, a fixed global image header can be used to decode all the blocks as shown in the FIG. 1B.

FIGS. 2A-2D illustrate an example scenario for compressing without rounding a 4×4 pixel dimension block of an image, according to exemplary embodiments as disclosed herein. Consider a 4×4 pixel dimension block of the image where the 4×4 pixel dimension block includes predefined samples. After performing the level shift and the DCT on the 4×4 pixel dimension block, the transformed pixel values in the 4×4 pixel dimension block with frequency coefficients can be obtained as shown in the FIG. 2A. The numerical values of the 4×4 pixel dimension block are the weights of the transformed basis vector. The weights are also referred as transformed coefficients.

On completing the level shift and the DCT process, a default adaptive quantization factor can be generated or can be pre-defined to form a quantization matrix as shown in the FIG. 2B. The default adaptive quantization factor can be applied to the transformed pixel values in the 4×4 pixel dimension block. Each frequency coefficient value in the 4×4 pixel dimension block matrix is divided by the default adaptive quantization factor to obtain a quantized matrix as shown in the FIG. 2C. During the process of quantization, rounding factor is not taken into account. For example consider a value of 198 to be quantized by the value 100, so 198/100=1.98, the value 1.98 can be rounded to 2. However, rounding is not taken into account and a value of 1 is used.

Now, the obtained quantized matrix may be scanned in a Zig Zag order and in the RLE to obtain a series of numbers as shown in the FIG. 2D. If it is determined to detect zeros before a non-zero coefficient, then the series of numbers is represented as the count of zeros (i.e., run length encoding). The scanned coefficients may be 60, 5, 5, 2, 4, 4, 2, (0, 2), 1 (end of coefficients), thereby removing trailing zeros. For example, the end of coefficients can be a binary value which is not a prefix of a code word.

On completing the RLE and Zig Zag scanning process, the number of bits for encoding the scanned coefficients are determined from a variable length table. The encoded bit estimate of each coefficient is added to obtain a sum of bits which is a number of bits used for encoding the scanned coefficients. If the sum is greater than the bit budget (e.g., in this case consider a bit budget of 96 bits), then a higher quantization value is used for quantizing the transformed 4×4 pixel dimension block (i.e., quantization matrix with elements larger than 100 in magnitude).

If the sum is smaller than the bit budget, then a smaller quantization value is used for quantizing the transformed 4×4 pixel dimension block. If the sum of {60, 5, 5, 2, 4, 4, 2, (0, 2), 1 (EOC)} is equal to 102 bits then the higher quantization matrix is used as the sum is exceeding the bit budget of 96 bits. If the sum of {60, 5, 5, 2, 4, 4, 2, (0, 2), 1 (EOC)} is equal to 86 bits then the lower quantization matrix is used as the sum is less than the bit budget of 96 bits. If the new quantization factor gives a higher bit sum, then the previous quantization level is selected and the quantized 4×4 pixel dimension block is encoded by using the variable length encoder, thereby obtaining the encoded output.

FIGS. 3A-3D illustrates another example scenario for compressing without rounding a 4×4 pixel dimension block of an image, according to exemplary embodiments as disclosed herein. Consider the 4×4 pixel dimension block of the image where the 4×4 pixel dimension block includes pre-defined samples. After performing the level shift and the DCT on the 4×4 pixel dimension block, the transformed pixel values in the 4×4 pixel dimension block with frequency coefficients can be obtained as shown in the FIG. 3A. The numerical values of the 4×4 pixel dimension block are the weights of the transformed basis vector. These weights are also referred as transformed coefficients.

On completing the level shift and the DCT process, a default adaptive quantization factor can be generated or can be pre-defined to form a quantization matrix as shown in the FIG. 3B. Generally, the quantization value at bottom left part is higher than quantization value at the top left part of the quantization table as shown in the FIG. 3B. The default adaptive quantization factor can be applied to the transformed pixel values in the 4×4 pixel dimension block. Each frequency coefficient value in the 4×4 pixel dimension block matrix is divided by the default adaptive quantization factor to obtain a quantized matrix as shown in the FIG. 3C. During the process of quantization, rounding is not taken into account.

Now, the obtained quantized matrix may be scanned in the Zig Zag order and in the RLE to obtain a series of numbers as shown in the FIG. 3D. If it is determined to detect zeros before a non-zero coefficient, then the series of numbers is represented as the count of zeros (i.e., run length encoding). The scanned coefficients may be 60, 3, 3, 1, 2, 2, 1 (end of coefficients (EOC)), thereby removing trailing zeros. For example, the end of coefficients can be a binary value which is not a prefix of code word.

On completing the RLE and Zig Zag scanning process, the number of bits for encoding the scanned coefficients are determined from the variable length table. The encoded bit estimate of each coefficient is added to obtain a sum of bits which is the number of bits for encoding the scanned coefficients. If the sum is greater than the bit budget (e.g., a bit budget of 96 bits), then a higher quantization value is used for quantizing the transformed 4×4 pixel dimension block (e.g., quantization matrix with elements larger than 100 in magnitude).

If the sum is smaller than the bit budget, then a smaller quantization value is used for quantizing the transformed 4×4 pixel dimension block. If the sum of {60, 3, 3, 1, 2, 2, 1 (EOC)} is equal to 102 bits then the higher quantization matrix is used as the sum exceeds the bit budget of 96 bits. If the sum of {60, 3, 3, 1, 2, 2, 1 (EOC)} is equal to 86 bits then the lower quantization matrix is used as the sum is less than the bit budget of 96 bits. If the new quantization factor gives a higher bit sum, then the previous quantization level is selected and the quantized 4×4 pixel dimension block is encoded by using the variable length encoder, thereby obtaining the encoded output.

Figure 4:
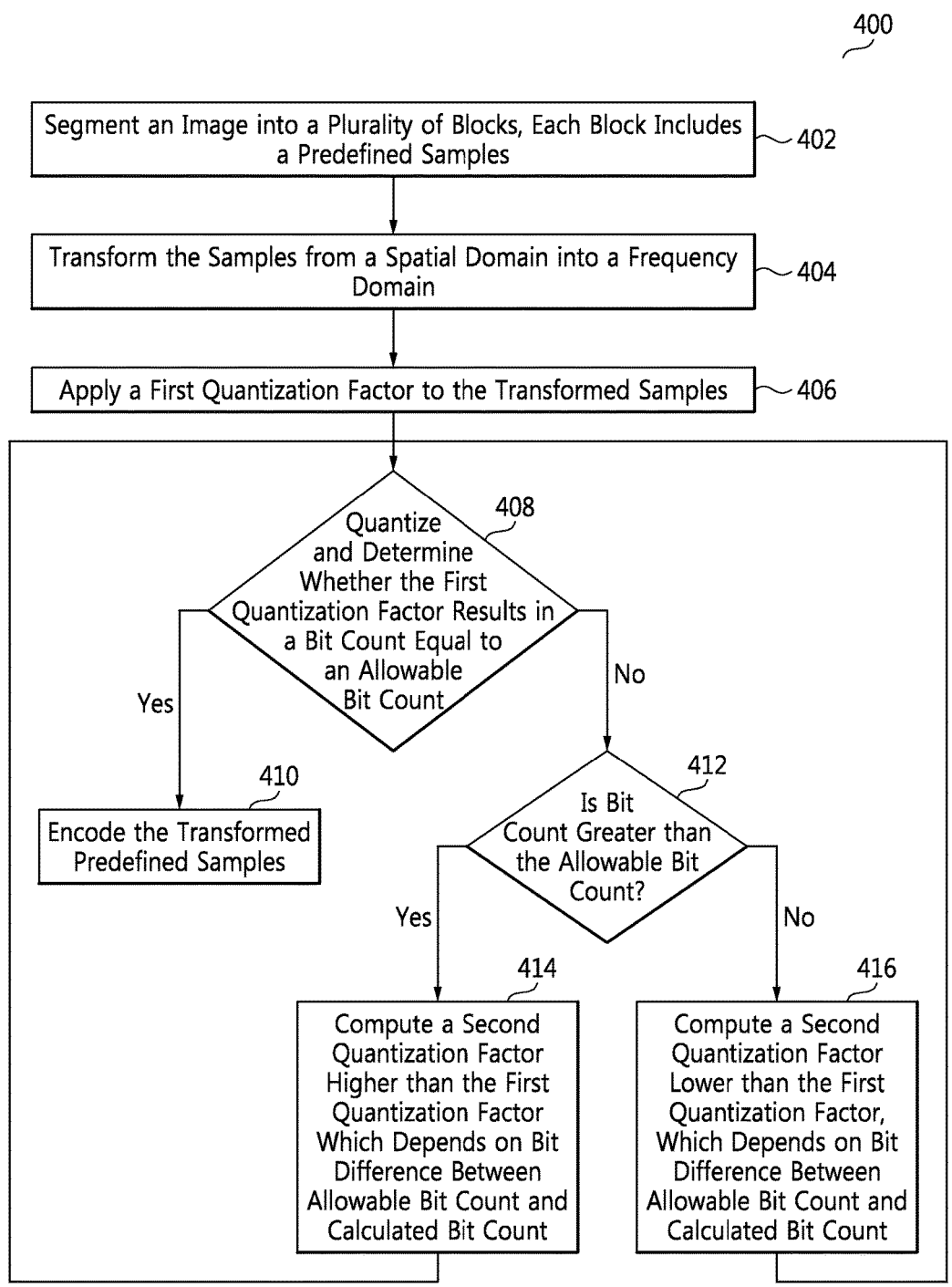
FIG. 4 is a flow diagram illustrating a method of image compression with random access capability using the DCT, according to an exemplary embodiment.

FIG. 4 is a flow diagram illustrating a method of image compression with random access capability, according to an exemplary embodiment as disclosed herein. The method 400 and other description described herein provide a basis for a control program which can be implemented using a microcontroller, a microprocessor, or a computer that reads and executes the control program recorded on a computer readable storage medium. Initially, the allowable bit count for the block of the image is selected. At operation 402, the method 400 includes segmenting an image into a plurality of blocks, wherein each block includes predefined samples. At operation 404, the method 400 includes transforming the predefined samples into a frequency domain. Here, the predefined samples may be transformed to the frequency domain using the DCT.

At operation 406, the method 400 includes applying a first quantization factor to the transformed predefined samples. At operation 408, the method 400 includes quantizing the transformed samples and determining whether the first quantization factor results in a bit count within the selected allowable bit count. If it is determined that the first quantization factor results in a bit count within the allowable bit count (operation 408, YES), at operation 410, the method 400 includes encoding the transformed predefined samples.

On the other hand, if it is determined that the first quantization factor does not result in a bit count within the allowable bit count (operation 408, NO), at operation 412, the method 400 includes determining whether the bit count is greater than the allowable bit count. If it is determined that the bit count is greater than the allowable bit count (operation 412, YES), then at operation 414, the method 400 includes computing a second quantization factor higher than the first quantization factor which depends on bit difference between the allowable bit count and the calculated bit count, and the operations 408 to 416 are performed with the second quantization value. On the other hand, if it is determined that the bit count is less than the allowable bit count (operation 412, NO), then at operation 416, the method 400 includes computing a second quantization factor lower than the first quantization factor which depends on bit difference between the allowable bit count and the calculated bit count, and the operations 408 to 416 are performed with the second quantization factor.

In an exemplary embodiment, the new quantization factor can be generated by selecting the quantization factor below or above the current quantization factor. For example, if the quantization factor of 20 is overshooting the bit count then the quantization value of 21 is selected. On the other hand, if the quantization factor 20 is undershooting the bit count then the quantization factor of 19 is selected. This is also known as a "naive" way.

In another exemplary embodiment, the new quantization factor can be generated by selecting the new quantization factor based on the difference between the current bit count and allowable bit count. If the quantization factor of 20 results in the bit count of 150 and the allowable bit count is 128, then a much higher quantization factor is selected. This is because the difference (150−128) is 22 and the value is large. So, the next quantization factor can be 24, a higher value (e.g., a step of 4) from 20. On the other hand, if the quantization factor 20 results in the bit count of 140, the next quantization factor can be 22, a higher value (e.g., a step of 2) from 20. The same is applicable in case of the the bit count is much less than the allowable bit count.

In another exemplary embodiment, the new quantization factor can be generated by moving in binary search order. If in case of quantization factors (i.e., 1, 2, 3, 4, 5, 6, 7, 8, 9), and selected 5 (i.e., middle) as the default quantization factor. The quantization factor of 5 provides the bit count of 150 which is much more than 128. Then next quantization factor of 9 is selected. The quantization factor of 9 provides the bit count of 118 which is less than 128. Therefore, the quantization factor of 7 (i.e., middle of 5 and 9) provides the bit count of 125 and the final quantization factor of 8 is selected.

In an example, consider a scenario by using the highest quantization level, the bit count is not within the allowable bit count. If the quantization level value 9 is used and the bit count is 130 then the high frequency quantized components are dropped. For example in series {60, 5, 5, 2, 4, 4, 2, (0, 2), 1 (EOC)}, value 1 is dropped, then (0, 2), then 2 and so on.

The various actions, acts, blocks, operations, and the like in method 400 may be performed in the order presented, in a different order or simultaneously. Further, in some exemplary embodiments, some actions, acts, blocks, operations, and the like may be omitted, added, modified, skipped, and the like without departing from the scope of the invention.

In an exemplary embodiment, the proposed method supports block sizes of 2×2, 4×4, 8×8, and 16×16. The possible combination of the fixed bits allocated to each block size of the image for different quality settings (e.g., $Q_0$, $Q_1$, and $Q_2$) are shown in the below Table-4, where bpb represents the number of bits per block. For instance 128 bpb for an 8×8 block; thereby, implying each 8×8 block will be encoded using 128 bits. The numbers in the Table-4 are bpb such as 32, 54, 128, 256, and 512.

TABLE 4

| Block support | $Q_0$ (Bpb) | $Q_1$ (Bpb) | $Q_2$ (Bpb) |
| --- | --- | --- | --- |
| 4 × 4 | 32 (2 bpp) | 64 (4 bpp) | 128 (8 bpp) |
| 8 × 8 | 64 (1 bpp) | 128 (2 bpp) | 256 (4 bpp) |
| 16 × 16 | 128 (0.5 bpp) | 256 (1 bpp) | 512 (2 bpp) |

Further, the number of bits per block depends on the mode setting and quality setting and the block size in the header. For example, the bits per block will be 128 for the quality setting of 2 and the block size of 4×4. Where, Variable encoded data+stuffing bits=constant bit count.

| Quantization level (5 bits, fixed) | Variable encoded data (AC and DC separated, Luma and chroma separated) + stuffing bits |
| --- | --- |

The quantization level in the above table is 5 bits. In this case, the proposed method obtains 32 levels of quantization.

The global header of the fixed size includes parameters common to all encoded blocks such as, for example, an encode mode Q0, Q1, etc., a dimension of the image and an identifying bit pattern (e.g., an identify the compressor).

Figure 5:
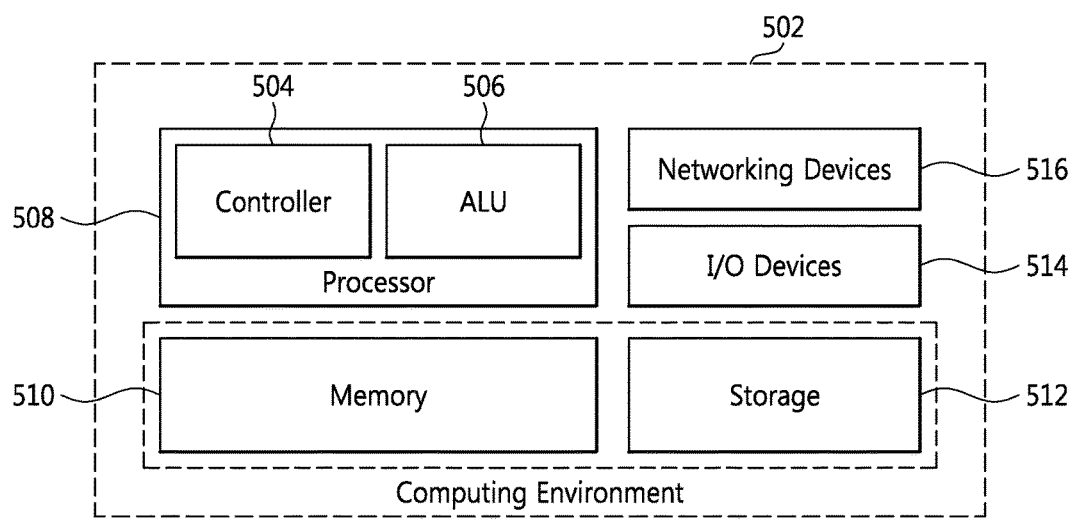
FIG. 5 illustrates a computing environment implementing the method and system of image compression with random access capability using the DCT, according to an exemplary embodiment.

FIG. 5 illustrates a computing environment implementing the method and system of image compression with random access capability using DCT, according to an exemplary embodiment as disclosed herein. As depicted in the figure, the computing environment 502 comprises at least one processor 508 that is equipped with a controller 504 and an Arithmetic Logic Unit (ALU) 506, a memory 510, a storage 512, plurality of networking devices 516, and a plurality Input output (I/O) devices 514. The processor 508 is responsible for processing the instructions of the algorithm. The processor 508 receives commands from the controller 504 in order to perform its processing. Further, any logical and arithmetic operations involved in the execution of the instructions are computed with the help of the ALU 506.

The overall computing environment 502 can be composed of multiple homogeneous and/or heterogeneous cores, multiple CPUs of different kinds, special media and other accelerators. The processor 508 is responsible for processing the instructions of the algorithm. Further, a plurality of processors 508 may be located on a single chip or over multiple chips.

The algorithm comprising of instructions and codes required for the implementation are stored in either the memory 510 or the storage 512, or both. At the time of execution, the instructions may be fetched from the corresponding memory 510 and/or storage 512, and executed by the processor 508.

In case of any hardware implementations various networking devices 516 or external I/O devices 514 may be connected to the computing environment to support the implementation in hardware.

The exemplary embodiments disclosed herein may be implemented through at least one software program running on at least one hardware device and performing network management functions to control the elements. The elements shown in FIGS. 1A through 5 include blocks which can be at least one of a hardware device, or a combination of hardware device and software module.

The foregoing description of the specific exemplary embodiments will so fully reveal the general nature of the exemplary embodiments herein that others can, by applying current knowledge, readily modify or adapt for various applications such specific exemplary embodiments without departing from the generic concept, and, therefore, such adaptations and modifications should and are intended to be comprehended within the meaning and range of equivalents of the disclosed exemplary embodiments. It is to be understood that the phraseology or terminology employed herein is for the purpose of description and not of limitation. Therefore, while certain exemplary embodiments herein have been described, those skilled in the art will recognize that the exemplary embodiments herein can be practiced with modification within the spirit and scope of the exemplary embodiments as described herein.

What I claim is:

1. A method of image compression with random access capability, the method comprising:
   segmenting an image into a plurality of blocks, each block including predefined samples;
   transforming the predefined samples into a frequency domain;
   applying a first quantization factor to the transformed predefined samples;
   determining whether application of the first quantization factor results in a bit count that is within a tolerance range of an allowable bit count; and
   adaptively computing a second quantization factor in response to determining that the bit count is not within the tolerance range of the allowable bit count,
   wherein adaptively computing the second quantization factor comprises:
      calculating a difference between the bit count and the allowable bit count; and
      computing the second quantization factor based on the first quantization factor and the calculated difference.

2. The method of claim 1, wherein the second quantization factor is adaptively computed in response to determining that the bit count is not equal to the allowable bit count.

3. The method of claim 2, wherein the second quantization factor is computed when the bit count is less than the allowable bit count.

4. The method of claim 2, wherein the second quantization factor is computed when the bit count is greater than the allowable bit count.

5. The method of claim 1, wherein the method further comprises:
   encoding the transformed predefined samples in response to determining that the bit count is within the tolerance range of the allowable bit count.

6. The method of claim 5, wherein the transformed predefined samples are encoded using variable length encoding.

7. The method of claim 1, wherein the predefined samples are transformed to the frequency domain using a Discrete Cosine Transform (DCT).

8. An encoder for image compression with random access capability, the encoder comprising a microprocessor that is configured to:
   segment an image into a plurality of blocks, each block including predefined samples;
   transform the predefined samples into a frequency domain;
   apply a first quantization factor to the transformed predefined samples;
   determine whether the first quantization factor results in a bit count that is within a tolerance range of an allowable bit count; and
   adaptively compute a second quantization factor in response to determining that the bit count is not within the tolerance range of the allowable bit count,
   wherein adaptively computing the second quantization factor comprises:
      calculating a difference between the bit count and the allowable bit count; and
      computing the second quantization factor based on the first quantization factor and the calculated difference.

9. The encoder of claim 8, wherein the second quantization factor is adaptively computed in response to determining that the bit count is not equal to the allowable bit count.

10. The encoder of claim 9, when the second quantization factor is computed when the bit count is less than the allowable bit count.

11. The encoder of claim 9, when the second quantization factor is computed when the bit count is greater than the allowable bit count.

12. The encoder of claim 8, wherein the microprocessor is further configured to:
   encode the transformed predefined samples in response to determining that the bit count is within the tolerance range of the allowable bit count.

13. The encoder of claim 12, wherein the transformed predefined samples are encoded using variable length encoding.

14. The encoder of claim 8, wherein the predefined samples are transformed to the frequency domain using a Discrete Cosine Transform (DCT).

15. A computer program product comprising computer executable program code recorded on a computer readable non-transitory storage medium, said computer executable program code when executed causing a computer to:
   segment an image into a plurality of blocks, each block including predefined samples;

transform the predefined samples into a frequency domain;

apply a first quantization factor to the transformed predefined samples;

determine whether the first quantization factor results in a bit count that is within a tolerance range of an allowable bit count; and adaptively compute a second quantization factor in response to determining that the bit count is not within the tolerance range of the allowable bit count, wherein adaptively computing the second quantization factor comprises:

calculating a difference between the bit count and the allowable bit count; and computing the second quantization factor based on the first quantization factor and the calculated difference.

16. The computer program product of claim 15, wherein the second quantization factor is adaptively computed in response to determining that the bit count is not equal to the allowable bit count.

17. The computer program product of claim 16, when the second quantization factor is computed when the bit count is less than the allowable bit count.

18. The computer program product of claim 16, when the second quantization factor is computed when the bit count is greater than the allowable bit count.

19. The computer program product of claim 15, said computer executable program code when executed further causing the computer to:

encode the transformed predefined samples in response to determining that the bit count is within the tolerance range of the allowable bit count.

20. The computer program product of claim 19, wherein the transformed predefined samples are encoded using variable length encoding.

21. The computer program product of claim 15, wherein the predefined samples are transformed to the frequency domain using a Discrete Cosine Transform (DCT).

22. A method of image compression with random access capability, the method comprising:

receiving an image that has been segmented into a plurality of blocks in which each block includes samples;

transforming the samples into a frequency domain;

applying a first quantization factor to the transformed samples;

determining whether application of the first quantization factor results in a bit count that is within a tolerance range of an allowable bit count;

adaptively computing a second quantization factor in response to determining that the bit count is not within the tolerance range of the allowable bit count; and compressing the image by applying the first quantization factor or the second quantization factor, wherein adaptively computing the second quantization factor comprises:

calculating a difference between the bit count and the allowable bit count; and computing the second quantization factor based on the first quantization factor and the calculated difference.

* * * * *